(12) United States Patent
Komorida et al.

(10) Patent No.: US 8,172,268 B2
(45) Date of Patent: May 8, 2012

(54) FUEL TANK FOR WORK VEHICLE

(75) Inventors: Takeshi Komorida, Sakai (JP);
Yoshiyuki Esaki, Sakai (JP); Eiji Satou,
Sakai (JP)

(73) Assignee: Kubota Corporation, Osaka (JP)

( * ) Notice: Subject to any disclaimer, the term of this patent is extended or adjusted under 35 U.S.C. 154(b) by 973 days.

(21) Appl. No.: 12/051,819

(22) Filed: Mar. 19, 2008

(65) Prior Publication Data
US 2008/0302805 A1    Dec. 11, 2008

(30) Foreign Application Priority Data

Jun. 5, 2007  (JP) .................................. 2007-149321

(51) Int. Cl.
*B60P 3/00* (2006.01)
*B60P 3/22* (2006.01)
*B62D 61/02* (2006.01)

(52) U.S. Cl. .......................... 280/830; 180/219; 220/562

(58) Field of Classification Search .................. 220/562, 220/18, 5, 563, 564; 280/830, 831, 833, 280/834; 180/219, 291, 225; D12/218, 400
See application file for complete search history.

(56) References Cited

U.S. PATENT DOCUMENTS

| | | | | |
|---|---|---|---|---|
| 2,946,598 A | * | 7/1960 | Foster | 280/830 |
| 3,129,014 A | * | 4/1964 | Hutchison et al. | 280/830 |
| 3,396,983 A | * | 8/1968 | Massey et al. | 280/830 |
| 4,488,603 A | * | 12/1984 | Schmittmann et al. | 169/24 |
| 7,413,132 B1 | * | 8/2008 | Bogart et al. | 239/169 |
| 2004/0129708 A1 | * | 7/2004 | Borchert et al. | 220/562 |
| 2005/0098369 A1 | * | 5/2005 | Augustine | 180/219 |

FOREIGN PATENT DOCUMENTS

| | | |
|---|---|---|
| JP | 49098624 U1 | 8/1974 |
| JP | 52037727 U1 | 3/1977 |
| JP | 62184031 U1 | 11/1987 |
| JP | 2003092913 A | 4/2003 |
| JP | 2004-236641 | 8/2004 |

\* cited by examiner

*Primary Examiner* — Bryon Gehman
*Assistant Examiner* — Shawn Braden
(74) *Attorney, Agent, or Firm* — The Webb Law Firm

(57) ABSTRACT

A work vehicle has a plurality of wheels including a first wheel and a fuel tank disposed upwardly of the first wheel. The fuel tank includes a first portion which is located higher than the highest point of the first wheel in a side view and which also is overlapped at least partially with the first wheel in a top view; a second portion disposed forwardly of the highest point of the first wheel and extending downwardly from the first portion so as to extend lower than the highest point of the first wheel, the second portion being in fluid communication with the first portion; and a third portion disposed rearwardly of the highest point of the first wheel and extending downwardly from the first portion so as to extend lower than the highest point of the first wheel, the third portion being in fluid communication with the first portion.

14 Claims, 4 Drawing Sheets

FUEL TANK FOR WORK VEHICLE

BACKGROUND OF THE INVENTION

The present invention relates to a work vehicle having a fuel tank mounted upwardly of a vehicle wheel.

As a fuel storing arrangement for use in a work vehicle described above, there is known an arrangement in which a fuel tank is provided with a bulging portion at a front end portion thereof in the fore-aft direction of the vehicle body, the bulging portion bulging downward so as to cover the wheel from above from the front side thereof (see, e.g. JP2004-236641).

Recently, there has been a need for increase in the capacity for the fuel tank so as to achieve improvement in working efficiency through reduction in the number of refueling operations required. However, mere capacity enlargement of fuel tank can invite disadvantageous enlargement of the work vehicle.

Then, it is conceivable to mount, instead of the fuel tank having the above-described conventional construction, a fuel tank configured to cover the upper side of the wheel from its rear side, through effective utilization of the space available above the wheel (the free space between the wheel and the fender). This construction, however, invites increase in the number of components. And, this also requires the trouble of feeding fuel to each individual fuel tank at the time of fuel replenishment.

SUMMARY OF THE INVENTION

The object of the present invention is to provide an improved fuel tank.

According to one embodiment of the invention, a work vehicle comprises:
 a plurality of wheels including a first wheel;
 a fuel tank disposed above the first wheel;
 wherein the fuel tank includes:
 a first portion which is located higher than the highest point of the first wheel in a side view and which also is overlapped at least partially with the first wheel in a top view;
 a second portion disposed forwardly of said highest point of the first wheel and extending downwardly from the first portion so as to extend lower than said highest point of the first wheel, said second portion being in fluid communication with said first portion; and
 a third portion disposed rearwardly of said highest point of the first wheel and extending downwardly from the first portion so as to extend lower than said highest point of the first wheel, said third portion being in fluid communication with said first portion.

With the above-described characterizing construction, it is possible to increase the capacity of the fuel tank through effective utilization of the space available upwardly of the wheel.

DETAILED DESCRIPTION OF PREFERRED EMBODIMENTS

Next, the present invention will be described in details by way of an embodiment in which the invention is applied to a riding vehicle type grass mower as one example of a working vehicle.

Figure 1:
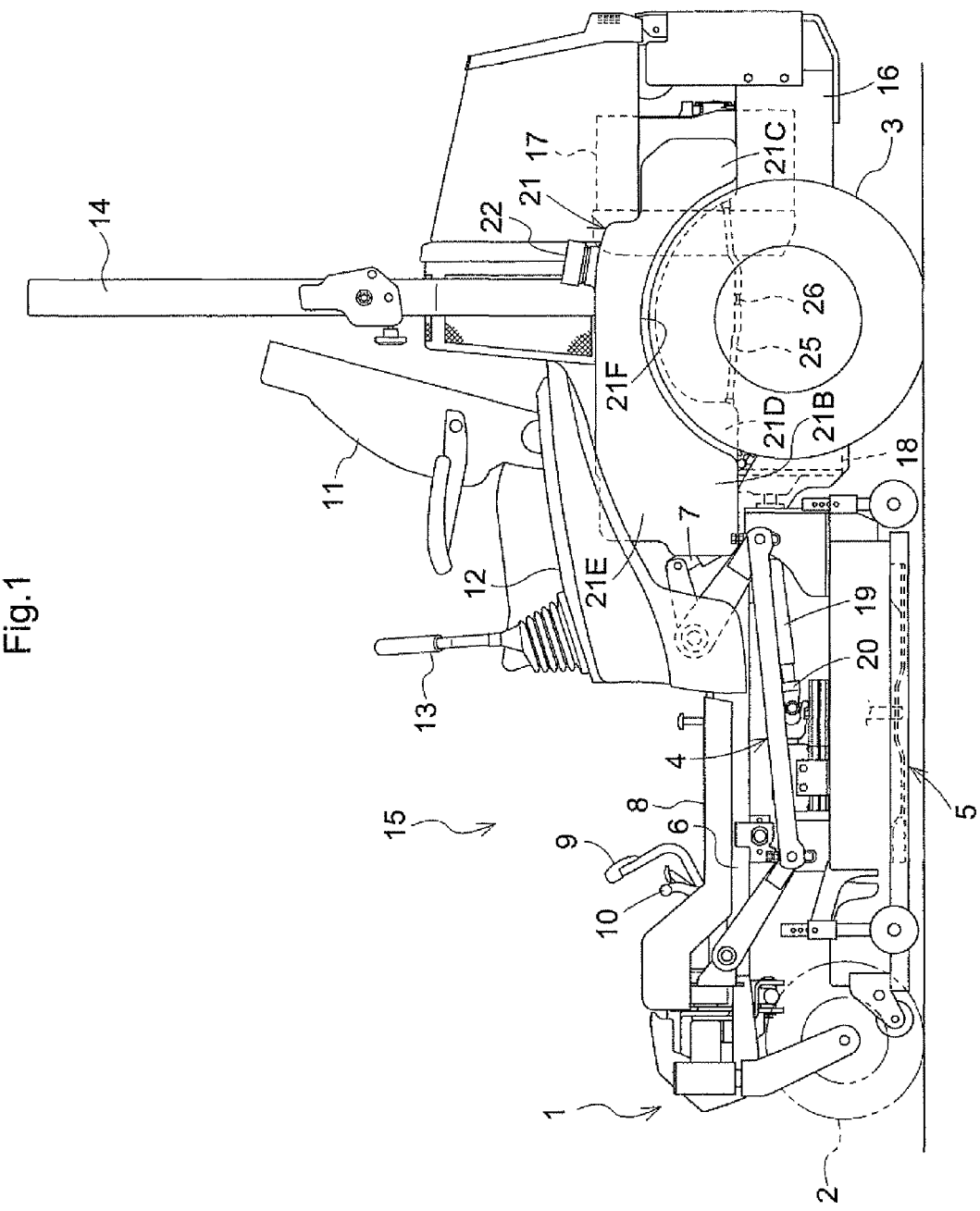
FIG. 1 is an overall side view showing a riding vehicle type grass mower.

FIG. 1 shows an overall side view of the riding vehicle type grass. As shown in this figure, the riding vehicle type grass mower employed exemplarily in the present embodiment is configured as a mid-mount type wherein between a pair of right and left front wheels 2 and a pair of right and left rear wheels 3 of a traveling vehicle body 1, there is mounted, via a link mechanism 4, a mower 5 to be lifted up/down.

The traveling vehicle body 1 includes, at a front side thereof, a front frame 6 comprised of angular pipe members or the like. The front frame 6 supports the link mechanism 4 and also mounts the front wheels 2 at the front right and left ends, with the front wheels 2 being steered about respective vertical axes.

The front frame 6 includes a boarding step 8 made of a plate metal and configured to cover this frame 6 substantially entirely from above. The link mechanism 4 is operable to lift up/down the mower 5 in parallel in response to an activation of a single-acting type hydraulic cylinder 7. On the surface of the boarding step 8, there is laid a rubber mat (not shown). And, at a front center region of the step 8, there are disposed a brake pedal 9 which is urged to return to its non-braking position and a lock pedal 10 capable of retaining the brake pedal 9 at its braking position against the urging force. Rearwardly and upwardly of the boarding step 8, there is provided a driver's seat 11 which is position-adjustable. On the right and left opposed sides of the driver's seat 11' there are disposed fenders 12 and speed changer levers 13 respectively. Rearwardly of the diver's seat 11, there is mounted erect an arch-like protection frame 14. That is to say, with this riding vehicle type grass mower, there is formed a riding driver's section 15 on the front side of the traveling vehicle body 1.

At a rear portion of the vehicle body 1, there is provided a rear frame 1 connected to the rear end of the front frame 6. This rear frame 6 mounts thereon an air-cooled type gasoline engine 17. Power from the engine 17 is speed-reduced by a transmission apparatus 18 disposed forwardly and downwardly of the engine 17 and split into a traveling power and a working power.

Though not shown, inside the transmission apparatus 18, there is provided a clutch for allowing/interrupting transmission of the working power. The traveling power from the transmission apparatus 18 is speed-changed by hydrostatic stepless transmission units (referred shortly to as "HST" hereinafter) connected continuously with the right and left sides of the transmission apparatus 18. The speed-changed power from the respective right/left HST is further speed-reduced by a speed reducing unit connected to the lateral side of the associated HST on the outer side of the vehicle body. Finally, the speed-reduced power from the right/left speed reducing unit is transmitted to the rear wheel 3 attached to and associated with this speed reducing unit.

Each one of the right and left HSTs has its speed changer shaft operably coupled with a corresponding speed changer lever 13, so that the HST may be operated for a speed changing operation in response to a forward or rearward pivotal operation on the speed changer lever 13. With this, in response to a forward or rearward pivotal operation on the speed changer lever 13, the HST corresponding to the respective operational lever 13 may be operated for a speed change so as to drive, in a changed-speed, the right or left rear wheel 3 associated therewith independently.

That is to say, with this riding vehicle type grass mower, the right and left front wheels 2 can be steered and driven and the right and left rear wheels 3 can be driven in a changed speed independently of each other, so that there can be provided, as desired, one of conditions consisting of a stopped condition with the right and left rear wheels 3 both being stopped, a straight traveling condition with the right and left rear wheels 3 both being driven forwardly or in reverse at an equal speed, a gentle turn condition with the right and left rear wheels 3 being driven forwardly or in reverse at different speeds from each other, a pivot turn condition with one of the right and left rear wheels 3 being stopped and the other thereof being driven forwardly or in reverse, and a spin turn condition with one of the right and left rear wheels 3 being driven forwardly and the other thereof being driven in reverse.

As shown in FIG. 1, the working power from the transmission apparatus 18 is transmitted via a transmission shaft 19 which is configured to be extendable and contractible and universal joints 20 provided at opposed ends of the transmission shaft 19 to the mower 5. With this, a constant-speed power can be provided to the mower 5, regardless of the traveling speed or traveling condition.

Figure 2:
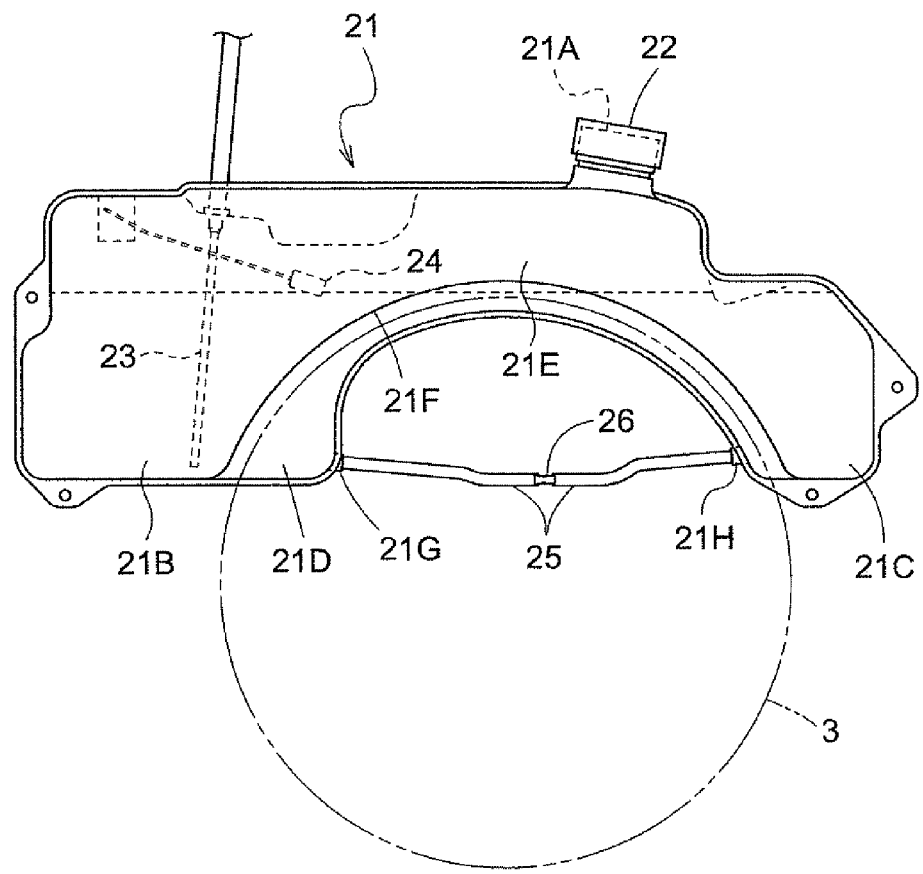
FIG. 2 is a side view of a fuel tank.
Figure 3:
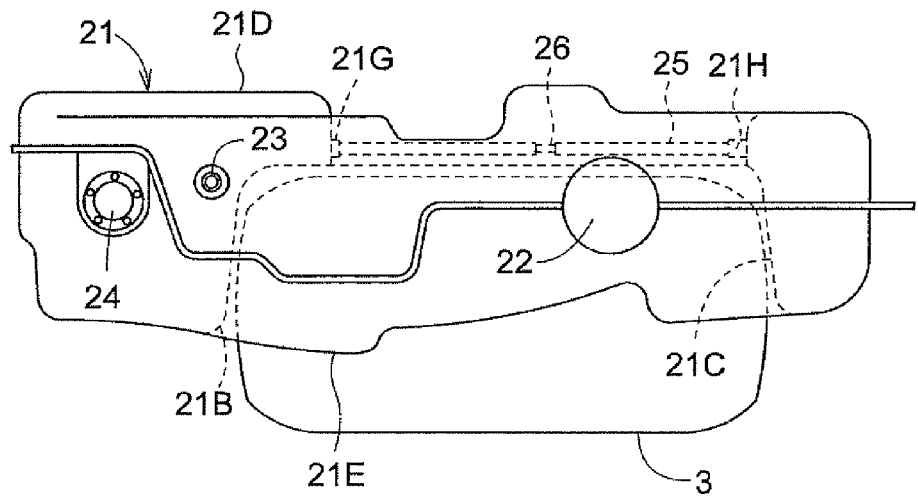
FIG. 3 is a plan view of the fuel tank.
Figure 4:
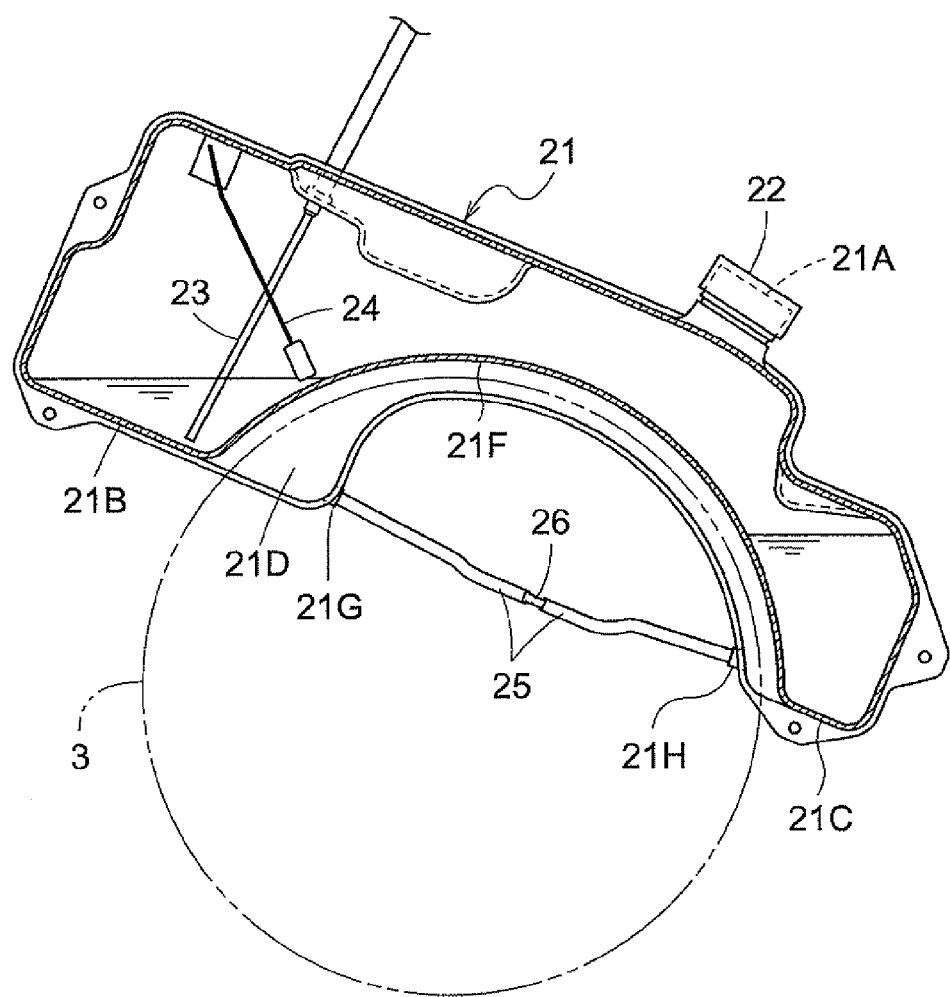
FIG. 4 is a side view in vertical section of the fuel tank.
Figure 5:
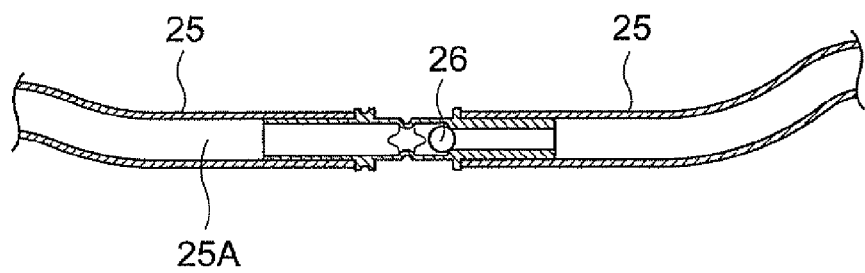
FIG. 5 is a side view in vertical section showing a communicating passway.

As shown in FIGS. 1-3, upwardly of each one of the right and left rear wheels 3, there is disposed a fuel tank 21 with utilizing the space formed between the rear wheel 3 and the fender 12 associated therewith. Each fuel tank 21 includes, at a rear upper end portion thereof a fuel filling opening 21A which is opened/closed by a threaded cap 22.

Each fuel tank 21 is configured as a two-forked shaped construction having, at opposed ends thereof in the fore-and-aft direction of the vehicle body, downwardly bulging portions 21B, 21C which bulge downwards, so that the tank 21 "strides over" the rear wheel 2 corresponding thereto in the fore-and-aft direction of the vehicle body. Also, each fuel tank 21 is formed with such an increased width that when this tank is mounted, an inner side portion 21D thereof located on the lateral side of the vehicle body inner side of the tank 21 may be located on more inner side of the vehicle body than the inner lateral face of the corresponding rear wheel 3. The inner side portion 21D of each fuel tank 21 is formed to bulge toward the center of the corresponding rear wheel 3 so that the portion 21D is overlapped with the outer peripheral portion of the rear wheel 3 in its lateral side view. For each fuel tank 21, an outer side portion 21E thereof located immediately above the corresponding rear wheel 3 is configured to have a curved portion 21F having a bottom face curved along the outer periphery of the corresponding rear wheel 3.

That is to say, the fuel tank 2 formed like a wide two-forked shaped construction and having the inner side portion 21D bulging toward the center of the rear wheel 3 in order to achieve increase in its capacity, is disposed in an advantageous manner through effective utilization of the space formed between the rear wheel 3 and the fender 12.

As shown in FIGS. 1-5, in each fuel tank 21, in the front side bulging portion 21B, there are provided a suction pipe 23 for allowing feeding of fuel to the engine 17 and a float type fuel gauge 24. In the front side bulging portion 21B, a communicating portion 21G which projects rearwards is provided in the bottom rear face of the inner side portion 21D. In the rear side bulging portion 21C, a communicating portion 21H which projects forwards is provided in the bottom rear face of the inner side portion 21D. To these front and rear communicating portions 21G, 21H, there is connected a communicating pipe 25 which forms a communicating passway 25A establishing communication between the portions 21G, 21H. The communicating pipe 25 incorporates therein a one-way valve 26 which prevents flow of fuel from the front side communicating portion 21G (front bulging portion 21B) to the rear side communicating portion 21H (rear bulging portion 21C).

With the above arrangement, an amount of fuel stored at the front bulging portion 21B will flow through the communicating passway 25A to the rear bulging portion 21C in the course of hill climbing of the vehicle. As a result, the amounts of fuel stored at the two-forked shaped respective fuel tanks 21 can be effectively fed to the engine 17, without running out of the fuel.

[Other Embodiments]

[1] The working vehicle to which the present invention is applied can be a mid-mount mower having a mower 5 mounted between the right and left front wheels 2 and the right and left rear wheels 3 of a four-wheel drive type traveling vehicle body 1, a front-mount mower having a mower 5 mounted forwardly of the right and left front wheels 2 of the traveling vehicle body, a tractor which allows additional mounting of an implement such as a mower 5, a riding vehicle type rice planting machine, etc.

[2] The fuel tank 21 may be provided only on one of the right and left sides of the traveling vehicle body 1.

[3] The fuel tank 21 may be disposed upwardly of the front wheel 3.

[4] The fuel tank 21 may be configured as a right/left integral type having a communicating portion for establishing communication between right and left fuel tanks (tank portions or halves) 21.

[5] The suction pipe 23 and the fuel gauge 24 may be provided in the rear bulging portion 21C and the one-way valve 26 for preventing fuel flow from the rear bulging portion 21C to the front bulging portion 21B may be provided in the communicating pipe 25 (communicating passway 25A).

[6] The communicating pipe 23 (communicating passway 25A) may not incorporate the one-way valve 26. In this construction, reverse flow of fuel may be prevented by providing a height difference between the front and rear bulging portions 21B, 21C.

Figure 6:
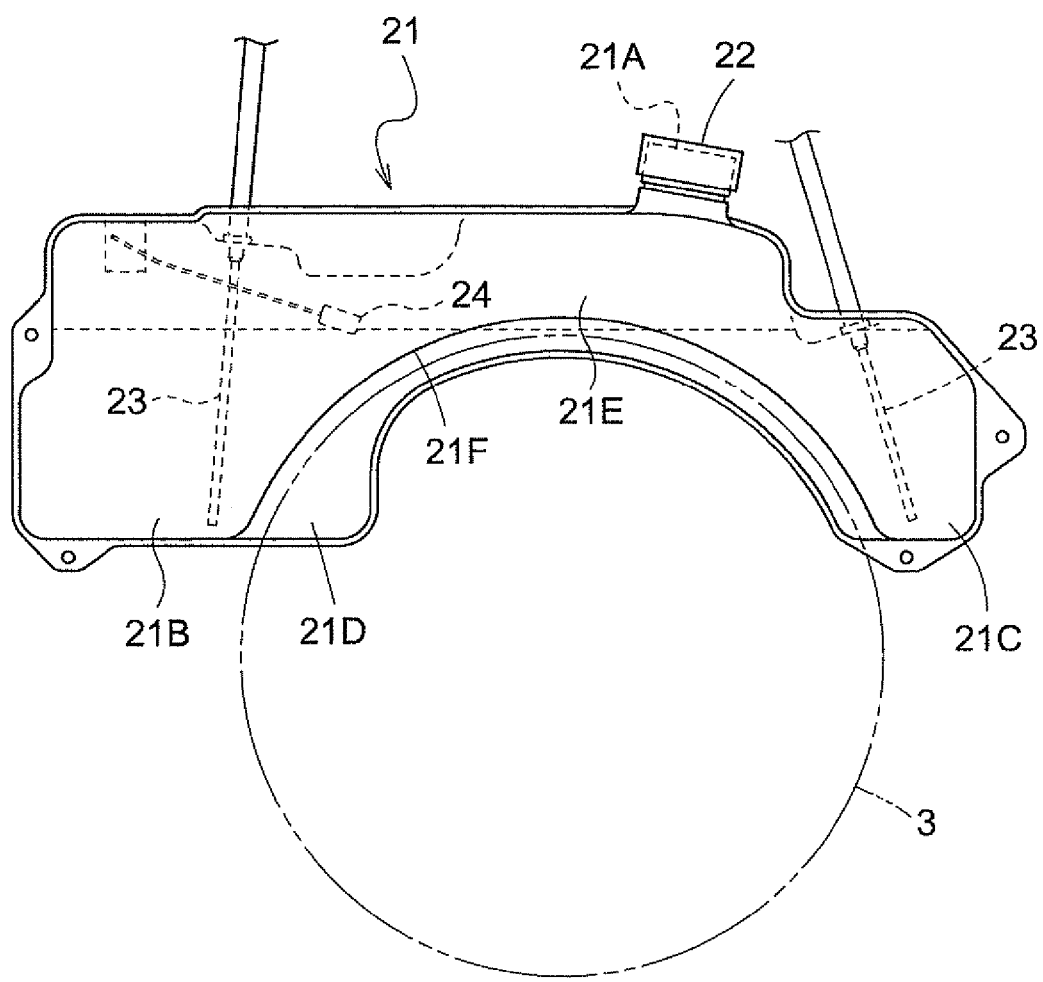
FIG. 6 is a side view of a fuel tank according to a further embodiment.

[7] As shown in FIG. 6, the suction pipe 23 may be provided in each one of the front and rear bulging portions 21B, 21C, rather than providing communication between the bottoms of the front and rear bulging portions 21B, 21C.

What is claimed is:

1. A work vehicle comprising:
a plurality of wheels including a first wheel, the plurality of wheels engaging the ground for driving the work vehicle;
a fuel tank disposed above the first wheel;
wherein the fuel tank includes:
a first portion which is located higher than the highest point of the first wheel in a side view and which also is overlapped at least partially with the first wheel in a top view;
a second portion disposed forwardly in a fore-and-aft direction of the work vehicle of said highest point of the first wheel and extending downwardly from the first portion so as to extend lower than said highest point of the first wheel, said second portion being in fluid communication with said first portion; and
a third portion disposed rearwardly in the fore-and-aft direction of the work vehicle of said highest point of the first wheel and extending downwardly from the first portion so as to extend lower than said highest point of the first wheel, said third portion being in fluid communication with said first portion, and wherein each one of said second portion and said third portion of the fuel tank includes a bottom which extends laterally more inwardly in a side-to-side direction of the work vehicle than an inner face of the first wheel; and said fuel tank includes a communicating passway for establishing direct fluid communication between the bottom of the second portion and the bottom of the third portion, at a position more inwardly than the inner face of the first wheel.

2. The work vehicle according to claim 1, wherein said communicating passway incorporates therein a one-way valve.

3. The work vehicle according to claim 1, wherein said fuel tank includes an arcuate lower face corresponding in shape to an outer periphery of the first wheel, the arcuate lower face being formed continuously by a bottom face of the first portion, a rear face of the second portion and a front face of the third portion.

4. The work vehicle according to claim 1, wherein said communicating passway is formed of a pipe extending substantially at a same height between the bottom of the second portion and the bottom of the third portion.

5. The work vehicle according to claim 1, further comprising:
    an engine;
    a communicating passway for establishing direct fluid communication between the bottom of the second portion and the bottom of the third portion at a position more inwardly than the inner face of the first wheel;
    a one-way valve incorporated in the communicating passway;
    a fuel filling opening disposed closer to one of the second portion and the third portion than said highest point of the first wheel; and
    a suction pipe extending through the other of the second portion and the third portion for allowing feeding of fuel to said engine;
    wherein said one-way valve is configured to allow flow of fuel from said one of the second portion and the third portion to said the other of the second portion and the third portion, and prevent the flow of fuel from said the other of the second portion and the third portion to said one of the second portion and the third portion.

6. The work vehicle according to claim 1, further comprising:
    an engine;
    a communicating passway for establishing direct fluid communication between the bottom of the second portion and the bottom of the third portion at a position more inwardly than the inner face of the first wheel;
    a one-way valve incorporated in the communicating passway;
    a fuel filling opening disposed closer to the third portion than said highest point of the first wheel; and
    a suction pipe extending through the second portion for allowing feeding of fuel to said engine;
    wherein a volume of said second portion is set larger than a volume of said third portion; and
    wherein said one-way valve is configured to allow flow of fuel from the third portion to the second portion, and prevent the flow of fuel from the second portion to the third portion.

7. The work vehicle according to claim 1, further comprising:
    a fuel gauge provided at said second portion.

8. A work vehicle comprising:
    a plurality of wheels, the plurality of wheels engaging the ground for driving the work vehicle;
    a fuel tank disposed above at least one wheel of said plurality of wheels;
    wherein the fuel tank includes:
        a first portion which is located higher than the highest point of said one wheel in a side view and which also is overlapped at least partially with said one wheel in a top view;
        a second portion disposed forwardly in a fore-and-aft direction of the work vehicle of said highest point of said one wheel and extending downwardly from the first portion so as to extend lower than said highest point of said one wheel, said second portion being in fluid communication with said first portion; and
        a third portion disposed rearwardly in the fore-and-aft direction of the work vehicle of said highest point of said one wheel and extending downwardly from the first portion so as to extend lower than said highest point of said one wheel, said third portion being in fluid communication with said first portion, and
    wherein each one of said second portion and said third portion of the fuel tank includes a bottom which extends laterally more inwardly in a side-to-side direction of the work vehicle than an inner face of the first wheel; and
    said fuel tank includes a communicating passway for establishing direct fluid communication between the bottom of the second portion and the bottom of the third portion, at a position more inwardly than the inner face of the first wheel.

9. The work vehicle according to claim 8, wherein said communicating passway incorporates therein a one-way valve.

10. The work vehicle according to claim 8, wherein said fuel tank includes an arcuate lower face extending in corresponding shape to an outer periphery of said one wheel, the arcuate lower face being formed continuously by a bottom face of the first portion, a rear face of the second portion and a front face of the third portion.

11. The work vehicle according to claim 8, wherein said communicating passway is formed of a pipe extending substantially at a same height between the bottom of the second portion and the bottom of the third portion.

12. The work vehicle according to claim 8, further comprising:
    an engine;
    a communicating passway for establishing direct fluid communication between the bottom of the second portion and the bottom of the third portion at a position more inwardly than the inner face of said one wheel;
    a one-way valve incorporated in the communicating passway;
    a fuel filling opening disposed closer to one of the second portion and the third portion than said highest point of said one wheel; and
    a suction pipe extending through the other of the second portion and the third portion for allowing feeding of fuel to said engine;
    wherein said one-way valve is configured to allow flow of fuel from said one of the second portion and the third portion to said the other of the second portion and the third portion, and prevent the flow of fuel from said the other of the second portion and the third portion to said one of the second portion and the third portion.

13. The work vehicle according to claim 8, further comprising:
an engine;
a communicating passway for establishing direct fluid communication between the bottom of the second portion and the bottom of the third portion at a position more inwardly than the inner face of said one wheel;
a one-way valve incorporated in the communicating passway;
a fuel filling opening disposed closer to the third portion than said highest point of said one wheel; and
a suction pipe extending through the second portion for allowing feeding of fuel to said engine;
wherein a volume of said second portion is set larger than a volume of said third portion; and
wherein said one-way valve is configured to allow flow of fuel from the third portion to the second portion, and prevent the flow of fuel from the second portion to the third portion.

14. The work vehicle according to claim 8, further comprising:
a fuel gauge provided at said second portion.

* * * * *

UNITED STATES PATENT AND TRADEMARK OFFICE
CERTIFICATE OF CORRECTION

| | | |
|---|---|---|
| PATENT NO. | : 8,172,268 B2 | Page 1 of 1 |
| APPLICATION NO. | : 12/051819 | |
| DATED | : May 8, 2012 | |
| INVENTOR(S) | : Takeshi Komorida et al. | |

It is certified that error appears in the above-identified patent and that said Letters Patent is hereby corrected as shown below:

Column 6, Line 26, Claim 8, delete "portion, and" and insert -- portion; and --

Signed and Sealed this
Twenty-first Day of August, 2012

David J. Kappos
*Director of the United States Patent and Trademark Office*